(12) United States Patent
Ye et al.

(10) Patent No.: US 10,375,780 B2
(45) Date of Patent: Aug. 6, 2019

(54) CONTROLLING OUTPUT VOLTAGE TO ACHIEVE ULTRA-LOW STANDBY POWER IN DIM-TO-OFF LED APPLICATIONS

(71) Applicants: DIALOG SEMICONDUCTOR INC., Campbell, CA (US); DIALOG SEMICONDUCTOR (UK) LIMITED, London (GB)

(72) Inventors: Zhiqiu Ye, Beijing (CN); Xiaolin Gao, Campbell, CA (US); Nailong Wang, Beijing (CN); Guanglai Deng, Beijing (CN); Yichuan Niu, Campbell, CA (US)

(73) Assignees: DIALOG SEMICONDUCTOR (UK) LIMITED, London (GB); DIALOG SEMICONDUCTOR, INC., Campbell, CA (US)

( * ) Notice: Subject to any disclaimer, the term of this patent is extended or adjusted under 35 U.S.C. 154(b) by 0 days.

(21) Appl. No.: 16/044,455

(22) Filed: Jul. 24, 2018

(65) Prior Publication Data

US 2019/0098713 A1    Mar. 28, 2019

Related U.S. Application Data

(63) Continuation of application No. 15/713,540, filed on Sep. 22, 2017, now Pat. No. 10,034,336.

(51) Int. Cl.
*H05B 33/08* (2006.01)
*H05B 37/02* (2006.01)
*H02M 1/08* (2006.01)
*H02M 3/335* (2006.01)
*H02M 1/00* (2006.01)

(52) U.S. Cl.
CPC .......... *H05B 33/0818* (2013.01); *H02M 1/08* (2013.01); *H02M 3/33523* (2013.01); *H05B 33/0845* (2013.01); *H02M 2001/0032* (2013.01); *H02M 2001/0048* (2013.01); *H05B 37/0272* (2013.01)

(58) Field of Classification Search
None
See application file for complete search history.

(56) References Cited

U.S. PATENT DOCUMENTS

| 9,705,408 | B2* | 7/2017 | Quigley | ............ H02M 3/33507 |
| 2009/0295469 | A1 | 12/2009 | DuBose | |
| 2013/0250627 | A1 | 9/2013 | Herfurth | |
| 2015/0162773 | A1 | 6/2015 | Wang | |

* cited by examiner

*Primary Examiner* — Jany Richardson
(74) *Attorney, Agent, or Firm* — Haynes and Boone, LLP

(57) ABSTRACT

An electronic device is provided that includes an integrated circuit (IC) configured to regulate an output voltage for powering a light emitting diode (LED). A first transistor is configured to be switched on or off by the IC to inductively couple or decouple a main power supply bus voltage from a primary winding of a transformer to a secondary winding of the transformer connectable to the LED. A second transistor is coupled between the IC and the main power supply bus voltage, and configured to be switched on or off by the IC to selectively provide an IC power supply input voltage to the IC.

10 Claims, 13 Drawing Sheets

CONTROLLING OUTPUT VOLTAGE TO ACHIEVE ULTRA-LOW STANDBY POWER IN DIM-TO-OFF LED APPLICATIONS

CROSS-REFERENCE TO RELATED APPLICATIONS

This application is a continuation of U.S. patent application Ser. No. 15/713,540, filed Sep. 22, 2017.

BACKGROUND

Technical Field

The present application generally relates to regulating power converters. More particularly, it relates to controlling output voltage to achieve ultra-low standby power in dim-to-off LED applications.

Related Art

One of the things that smart homes provide is the ability to remotely control home devices over a wireless network such as, Wifi, Z-wave, Zigbee, or Bluetooth Low Energy (BLE). For example, a light-emitting diode (LED) may be turned-on or turned-off with a switch that is part of the smart home wireless network. A remote user device connected to the wireless network may be used to remotely dim the LED over the wireless link between the remote user device and the switch.

In a conventional LED switch (e.g., a wall switch), it is not trivial to understand that a user simply flips the switch in order to turn the LED on or off. When the LED is off, power is not needed at the switch because the LED is not on. However, in the case of a remotely operated LED switch, such as that of a smart home, the switch needs to be able to respond to a wake-up signal from the remote user device, for example, to turn on the LED. Thus, the switch needs to be alive (and not shut down) in order to be able to respond to a wake-up signal. Consequently, this consumes power, even when the LED is off.

Thus, it is desirable to reduce power consumption by the electronic device, especially, when the device is in a standby state. In the example of the LED switch, when the LED is effectively off, it is desirable to reduce power consumption to the minimum power that is required to keep the switch alive.

As such, there is an ever growing demand to reduce power consumption. For example, in order for a solid-state lighting device, such as an LED light, to receive an "Energy Star" certification, the entire device, including the power supply for the LED light and additional auxiliary power supply for the switch module can consume less than 0.5 W in standby. In other instances, governmental regulations may stipulate power limits for energy efficiency. For example, California Code of Regulations Title 20 mandates that the device consumes less than 0.2 W in standby. As such, there is a great push to reduce power consumption, particularly in devices that are in standby modes.

SUMMARY

In dimmable LED lighting applications, there is a growing demand for a so-called "dim-to-off" feature. Dim-to-off allows for a lighting solution to put the LED into "light-off" state when it receives a command from a remote user device such as, for example, by a 0-10V dimmer switch, a microcontroller unit, or BLE wireless module (e.g., as part of an TOT function for a smart home). During the "light-off" state, the system is in a standby mode, waiting for a wake-up signal from the remote user device to return to the normal lighting mode at any time. Embodiments of the present disclosure explore techniques for keeping power consumption low in this "light-off" state.

According to a first aspect, an electronic device is described. The device includes an integrated circuit (IC) configured to regulate an output voltage for powering a light emitting diode (LED); a first transistor configured to be switched on or off by the IC to inductively couple or decouple a main power supply bus voltage from a primary winding of a transformer to a secondary winding of the transformer connectable to the LED; and a second transistor coupled between the IC and the main power supply bus voltage, and configured to be switched on or off by the IC to selectively provide an IC power supply input voltage to the IC, wherein the second transistor is configured to be switched on in response to: the IC decreasing the output voltage to less than about one-third of a nominal operating voltage of the LED, and detecting that the IC power supply input voltage is less than a first threshold voltage.

According to a second aspect, a method for regulating a voltage is described. The method includes reducing an output voltage coupled with a light emitting diode (LED) to about one-third of a nominal operating voltage of the LED with a dimming signal to a voltage regulating integrated circuit (IC); and switching on a transistor coupled between the IC and a main power supply bus to apply a main power supply bus voltage to the IC in response to: the IC decreasing the output voltage to less than about one-third of a nominal operating voltage of the LED, and detecting that the power supply input voltage of the IC is less than a first threshold voltage.

According to a third aspect, an electronic device is described. The device includes an integrated circuit (IC) configured to regulate an output voltage powering a light emitting diode (LED); and a transistor configured to be switched on or off by the IC to inductively couple or decouple a main power supply bus voltage from a primary winding of a transformer to a secondary winding of the transformer connectable to the LED, wherein the IC is configured to enter a light-off state in response to receiving a signal comprising a duty ratio less than a predetermined threshold, and wherein in response to the IC entering the light-off state, the transistor is configured to be: switched on when an IC power supply input voltage is less than a first threshold voltage, and switched off when the IC power supply input voltage is greater than a second threshold voltage.

According to a fourth aspect, a method is described. The method includes reducing an output voltage coupled with a light emitting diode (LED) to about one-third of a nominal operating voltage of the LED with a dimming signal, to place a voltage regulating integrated circuit (IC) in a low power mode; and switching on a transistor configured to inductively couple or decouple a main power supply bus voltage from a primary winding of a transformer to a secondary winding of the transformer connectable to the LED, the switching on being in response to: the IC entering the low power mode, and an IC power supply input voltage being less than a first threshold voltage.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
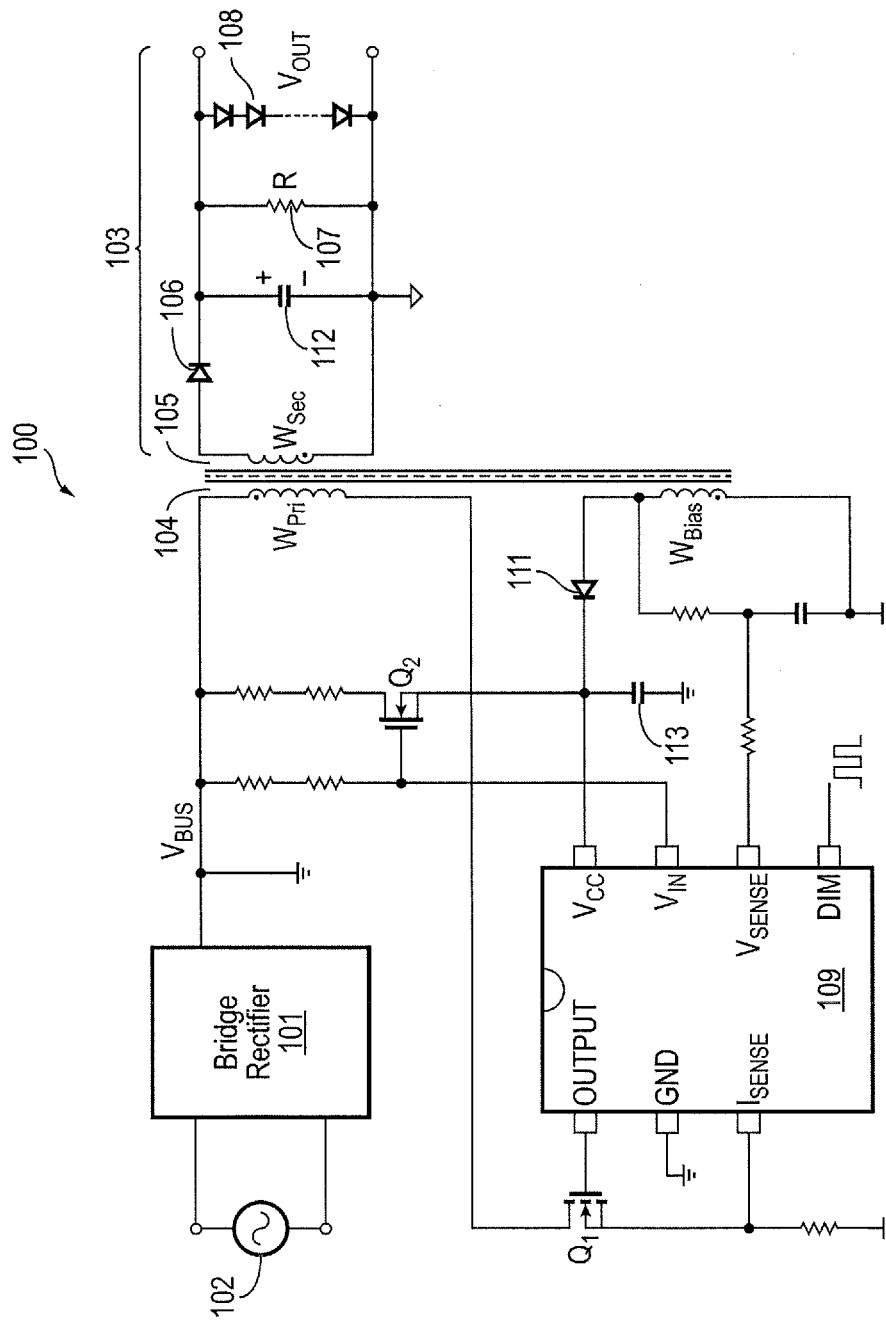
FIG. 1 is an exemplary circuit diagram of a single stage flyback converter, according to an embodiment of the present disclosure.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

In 0-10V or pulse-width modulated (PWM) dimmable LED lighting solutions, a dim-to-off feature uses an LED driver that is able to turn off the LED in response to a signal from either a dimmer or a wireless controller. In a light-off state, an integrated circuit (IC) of the converter needs to be alive, in order to respond to the wake-up call at any time to quickly recover the system to the normal lighting mode. It is also desired for the system to consume the lowest power when in the light-off state, since the system may be in the light-off state for an indefinite period. That is, lamps tend to be off for much longer than they are on. Herein the present disclosure, a "light-off" state may also be referred to as a "standby" state. In the light-off state, the LED may not necessarily be completely off but the output voltage is substantially reduced such that the light is not visible, and appears to be off to the human eye. For example, when the duty ratio of the PWM signal is less than 1%, e.g., about 0.5%, then the LED is in the light-off mode.

Manufacturers generally like to design a single product that is compatible with many end-products devices to save cost. Similarly, lighting solution manufacturers like to design products that support a wide variety of LED driver-end devices. For example, it is desirable to produce a switch or a converter that can support different LED driver-end devices with output voltages that are twice as wide. That is, for example, the same device may be able to support applications having output specifications in the range of 40V 1 A to 20V 1 A. This way, one platform design can be used with various modules having different output voltages, but the same output current, so as to bring down the overall cost (e.g., design costs, inventory costs, qualification cost, etc.). Given this consideration, if an LED was dimmed from 100% of nominal operating output to 1%, the LED voltage may drop 70%, by way of example. Thus, for purposes of explaining the various embodiments of the present disclosure, approximately "one-third" of the nominal voltage will be used to refer to a voltage that will put, and keep the LED in the light-off state (i.e., LED off). However, this approximate value of one-third may be different, as long as it is low enough to keep the LED off.

As such it is desirable to achieve a dim-to-off function in a power converter by controlling the output voltage to a very low value to maintain the LED off for various modules, while also achieving ultra-low standby power consumption (e.g., 75 mW in standby for a 75 W nominal design).

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

An exemplary circuit of a single stage flyback converter 100 is illustrated in FIG. 1. The circuit includes a bridge rectifier 101 for rectifying an input AC signal 102 and generating a direct current (DC) voltage from the bridge rectifier 101 on main power supply bus VBUS. The bridge rectifier is coupled to the flyback converter 100, which is coupled to an output circuit 103 via a transformer having a primary winding 104 and a secondary winding 105. The output circuit 103 may include components such as a secondary diode 106, an output capacitor 112, and dummy load 107, all coupled to a load (e.g., a light emitting diode (LED) 108). The primary winding is part of the flyback converter 100 and it has a first electrode coupled to a main power supply bus VBUS, and a second electrode coupled to a switch (e.g., transistor Q1), which is configured to be selectively turned on and turned off.

When transistor Q1 is turned on, energy is built up in the primary winding 104, and when transistor Q1 is turned off, the energy from the primary winding 104 is transferred to the secondary winding 105. Thus, when transistor Q1 is turned on and then turned off, the voltage from the main power supply bus VBUS is transferred from the primary winding 104 to the secondary winding 105, and ultimately provides an output current to the LED 108. When the LED 108 receives the output current, the LED 108 turns on to a brightness corresponding to the magnitude of the output current.

In some embodiments, a gate electrode of transistor Q1 is coupled to an integrated circuit (IC) 109 as illustrated in FIG. 1. In this manner, the IC 109 can be configured to apply a voltage corresponding to a high or a low signal to the gate of switch Q1 in order to turn on or turn off switch Q1, respectively.

In some embodiments, the flyback converter 100 illustrated in FIG. 1 includes a transistor Q2 coupled between the main power supply bus VBUS and the IC 109. More particularly, a first electrode of transistor Q2 is coupled to the main power supply bus VBUS, a second electrode of transistor Q2 is coupled to a power supply input (VCC) of the IC 109 and a power supply capacitor 113, and a gate electrode of transistor Q2 is coupled to VIN of the IC 109.

In some embodiments, a pulse width modulated (PWM) signal is provided to input DIM of the IC 109 to modulate the LED 108 output current based on the duty ratio of the PWM signal. For example, the LED 108 may be dimmed from a full on at 100% nominal current to a very dim LED at 1% of the nominal current by affecting the duty ratio of the PWM signal at input DIM.

Some of the obstacles faced when precisely regulating the output voltage at low voltages, relative to its nominal voltages (e.g., one-third of its nominal voltage), include preventing cross-regulation between the output voltage VOUT and the power supply input voltage VCC, and keeping the LED 108 alive by preventing the power supply input voltage VCC (and consequently output voltage VOUT) from dropping below an undervoltage-lockout (UVLO) voltage below which, the IC 109 would shut down. Herein the present disclosure, regulating of the output voltage is described, but what is actually regulated is the current. Consequently, the output voltage is regulated because the current is regulated.

As the output voltage VOUT is reduced by lowering the duty ratio of the PWM signal, the output power is significantly reduced due to the $V_{out}^2/R_L$ relationship, where $R_L$ is the output dummy load 107. At this point, the primary side of the flyback converter becomes vulnerable to cross-regulation between the output voltage VOUT and power supply input voltage VCC.

Cross-regulation is related to the difference between the power consumption by the output load (e.g., LED 108) and the VCC load (e.g., IC 109). That is, assuming that the secondary winding 105 and the auxiliary winding 110 are the same in various aspect (i.e., turns, coupling with primary, etc.), then the IC 109 (via VSENSE) will regulate the output voltage VOUT when the output voltage VOUT loading is heavier than the power supply input voltage VCC loading. For example, VSENSE of the IC 109 can sense the output voltage VOUT or power supply input voltage VCC, depending on which of the current of secondary winding 105 or the current of the auxiliary winding 110 dies later.

One technique to avoid cross-regulation when going from normal to light-off mode is to increase the dummy load 107 by reducing preload to increase the loading on the output voltage VOUT. However, reducing preload results in higher resistive losses, which may increase power consumption, thus adversely affecting the standby power consumption requirements. Cross-regulation may also be avoided by lowering the VCC load (e.g., IC 109) by reducing the power consumed by the IC 109. By reducing the IC 109 power consumption (e.g., 3 mA to 0.5 mA), the IC 109 operates at reduced power in a "low power mode," and lowers the VCC loading (thus VOUT loading is relatively greater). Consequently, the low power mode of the IC 109 contributes to the overall objective of reducing power consumption by the converter and the LED 108, particularly, when the LED 108 is in the light-off mode. That is, the LED 108 consumes less power because it is in the light-off mode, and the IC 109 consumes less power because it is in the low power mode, all while avoiding cross-regulation. Low power mode provides sufficient power for the IC 109 because the LED 108 is effectively off, and the IC 109 needs just enough power to stay alive.

In some embodiments, the power supply input voltage VCC can be temporarily charged to avoid dropping below UVLO, which causes system to shut down. Transistor Q2 may be turned on to charge power supply input voltage VCC from the main power supply bus VBUS. For example, during a transient state when the output voltage VOUT is being lowered from nominal voltage to a reduced operating voltage (e.g., 100% to 33.3%), transistor Q2 may be turned on by applying a high voltage to the gate of transistor Q2 from VIN of the IC 109. When Q2 is turned on, current from the main power supply bus VBUS flows through transistor Q2 to charge power supply input voltage VCC. In this way, power supply input voltage VCC can be charged even while the output voltage VOUT is in a transient state because the charging takes place on the primary side, without affecting the secondary side where the output voltage VOUT is being discharged. It should be noted, however, that charging from the main bus is not energy-efficient, and therefore should not be used for extended time, such as, for example, after the output voltage VOUT reaches steady state.

If the power supply input voltage VCC is reduced below an undervoltage-lockout (UVLO) voltage of the LED 108, the converter 100 (i.e., LED 108 and IC 109) would actually shut down, instead of being in a standby state. Once it shuts down, a wake-up signal would not be able to restore the IC 109 to turn the LED 108 back on. Thus, it is desirable for the IC 109 to be in a standby state instead of being shut down so that the LED 108 can be turned back on through electronic remote means (e.g., BLE, microcontrollers, etc.). Thus, it is important to keep the power supply input voltage VCC above the UVLO voltage.

By charging the power supply input voltage VCC through transistor Q2 from the main power supply bus VBUS, the power supply input voltage VCC can be maintained above the UVLO voltage threshold to avoid shutting down the LED 108. As known by those skilled in the art, the UVLO voltage is a built-in parameter of the IC 109, and may vary among different ICs.

Figure 2:
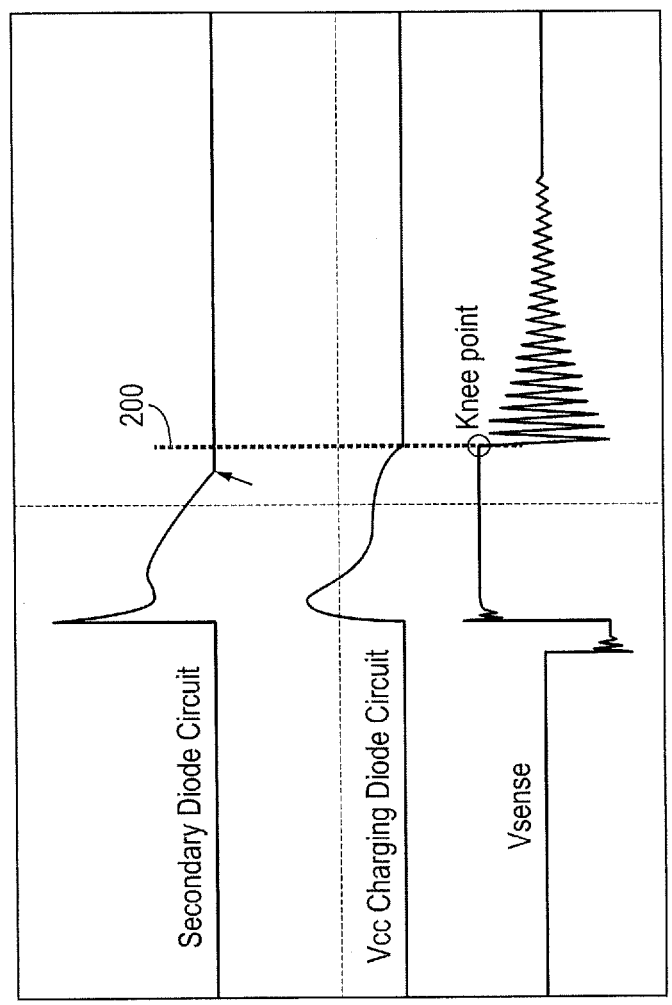
FIG. 2 is a graphical representation of the secondary diode current, VCC charging diode current, and VSENSE voltage when there is cross-regulation in the flyback converter.
Figure 3:
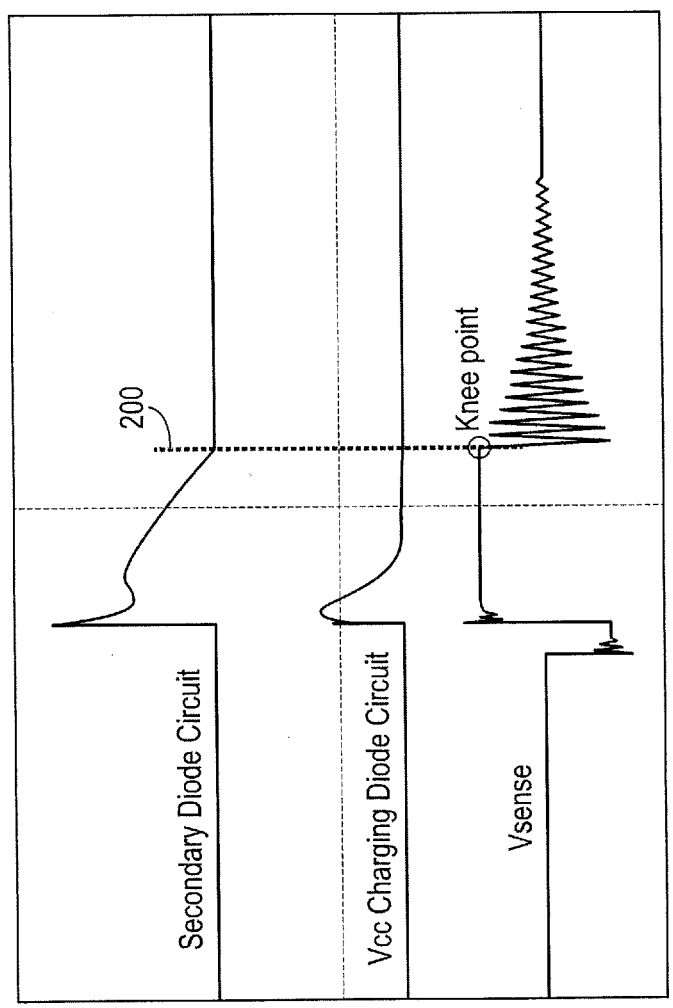
FIG. 3 is a graphical representation of the secondary diode current, VCC charging diode current, and VSENSE voltage without cross-regulation in the flyback converter.

FIG. 2 shows a graphical representation of the secondary diode current, VCC charging diode current, and VSENSE voltage when there is cross-regulation in the flyback converter. As shown, the secondary diode current dies before the VCC charging diode current dies at the knee point, shown with line 200. For example, if the load in the secondary side is lighter, then the output voltage VOUT will be pushed higher due to energy imbalances. Consequently, the secondary diode current dies faster due to a relationship shown by Ldi/dt=VOUT for the same secondary peak current as the output voltage VOUT increases. On the other hand, the IC 109 power consumption can be reduced by reducing the VCC charging diode current so that the VCC charging diode current dies before the secondary diode current at the knee point, as illustrated in FIG. 3 to avoid cross-regulation.

Figure 4:
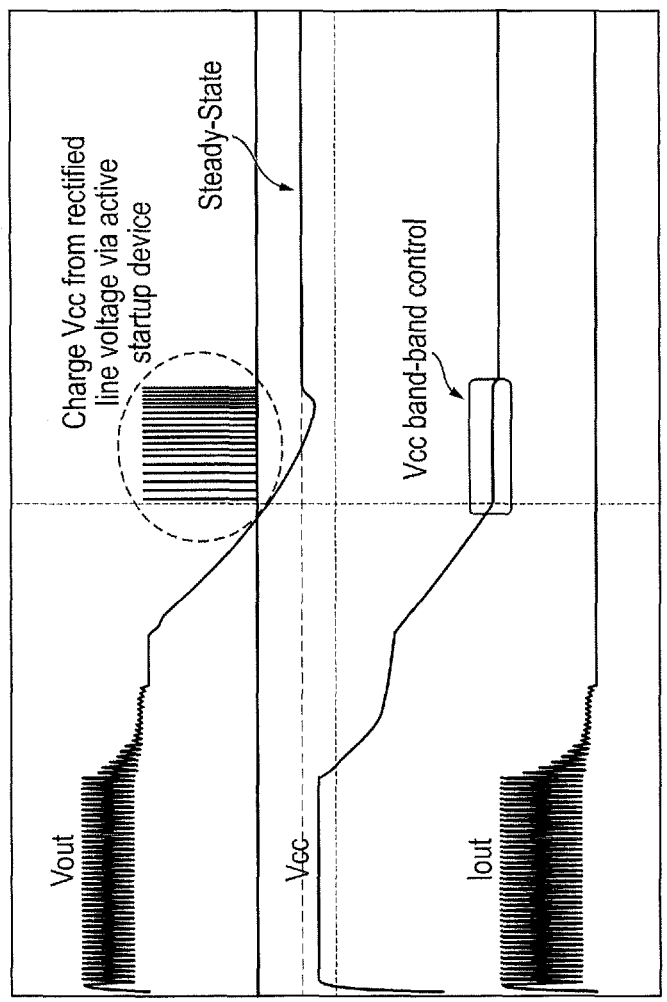
FIG. 4 is a graphical representation of the output voltage VOUT, transistor Q2, power supply input voltage VCC, and output current IOUT, when the output voltage VOUT is transitioning to a steady state low voltage, according to an embodiment of the present disclosure.

FIG. 4 shows a graphical representation of the output voltage VOUT, transistor Q2, power supply input voltage VCC, and output current IOUT, when the output voltage VOUT is lowered and the transistor Q2 is turned on to charge the power supply input voltage VCC, when the LED 108 is taken from a normal operating mode (e.g., VOUT=48V) to the light-off state (e.g., VOUT=16V or one-third of 48V), according to an embodiment of the present disclosure.

With the output capacitor 112 in place on the secondary side, the process of lowering (i.e., by discharging) the output voltage VOUT may be relatively slow, depending on the size of the output capacitor 112. In order to avoid prolonging the discharge process, the frequency of the PWM signal to the DIM input of IC 109 is kept low, e.g., about 25 Hz, thus reducing the energy transfer between the primary winding 104 to the secondary winding 105 to nearly zero. As a result, power supply input voltage VCC may drop faster and go below the UVLO voltage before the output voltage VOUT reaches its steady state voltage.

To prevent the power supply input voltage VCC from falling below the UVLO voltage, a first threshold voltage and a second threshold voltage for the power supply input voltage VCC are set so that the transistor Q2 can be turned on and turned off to charge power supply input voltage VCC from the main power supply bus VBUS, to keep the power supply input voltage VCC between the first threshold voltage and the second threshold voltage, according to an embodiment of the present disclosure. In the illustrated embodiment, the first threshold is above the UVLO voltage (e.g., 10.0V) and the second threshold voltage (e.g., 11.0V) is slightly greater than the first threshold voltage. In this manner, the power supply input voltage VCC may be maintained above UVLO to prevent shutdown during the transient from normal operation state to light-off state.

Thus, as shown in FIG. 4, as output voltage VOUT and power supply input voltage VCC begin to lower, transistor Q2 cycles on and off to keep the power supply input voltage VCC between the first threshold voltage and the second threshold voltage. When the output voltage VOUT ultimately reaches steady state, the transistor Q2 turns off and remains off so that power is not consumed through the energy-inefficient main power supply voltage VBUS. As such, charging through the main power supply bus voltage VBUS through the transistor Q2 is used when entering the light-off mode from normal mode, but once the system reaches steady state in light-off mode, the power supply bus voltage VBUS is no longer used. Furthermore, once the IC 109 has entered the low power mode, the PWM signal may be changed to a pulse-frequency modulation (PFM) signal to reduce the energy that is delivered.

Figure 5:
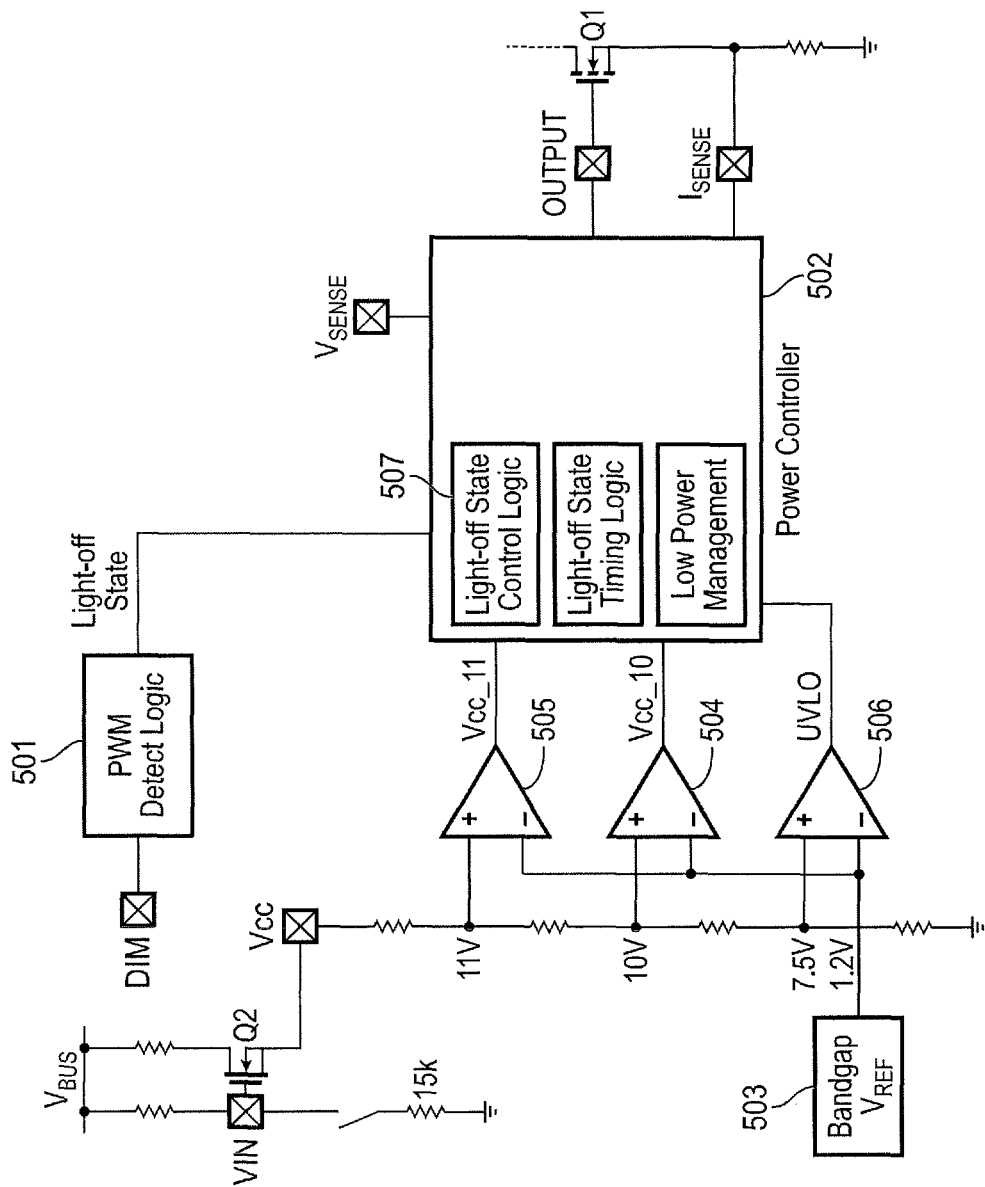
FIG. 5 is a circuital diagram of an exemplary converter for regulating the output voltage VOUT while avoiding cross-regulation and maintaining the power supply input voltage VCC above the UVLO voltage, according to an embodiment.

FIG. 5 is a circuital diagram of an exemplary converter for regulating the output voltage VOUT while avoiding cross-regulation and maintaining the power supply input voltage VCC above the UVLO voltage, according to an embodiment.

In some embodiments, a PWM Detect Logic 501 measures the PWM input signal at DIM input of the IC 109. When the duty-ratio is less than a predetermined threshold value (e.g., 0.5%), which is less than the lowest dimming level of the LED 108 (e.g., 1.0%), power controller 502 puts the IC 109 into light-off state. Once the IC 109 is in the light-off state, the power controller 502 enables low power mode to reduce VCC consumption by the IC 109. The low power mode may be achieved by, disabling unnecessary analog function blocks e.g., cut VDAC and IDAC, VSENSE comparators and ISENSE comparators, slowing down the driver and some of comparators, slowing down digital clock speed (e.g., by ⅟₁₆ of the original speed), and disabling unnecessary logic (e.g., no thermal detection is required during light-off state).

Figure 6:
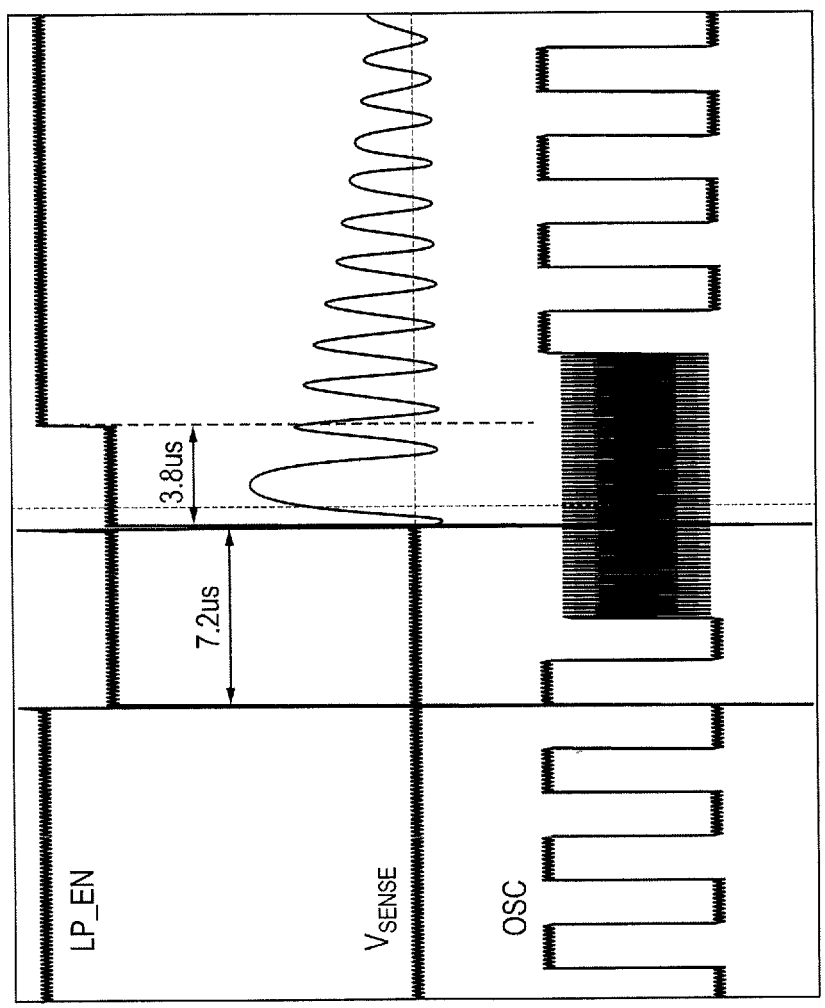
FIG. 6 is a graph of various signals during low power mode.

In some embodiments, a timing logic is used to implement the low power mode and to wake up from the light-off state back to the normal operating state. FIG. 6 shows an example sequence of signals. The clock frequency is masked by the low power mode enabling signal LP_EN. When LP_EN is high, the low power mode is enabled, and vice versa. In the light-off mode, the switching frequency is substantially reduced (e.g., 1 kHz). During most of time in the 1 ms switching period, the LP_EN is high, and the clock speed is reduced by ⅟₁₆ or more (e.g., ⅟₆₄) to save power supply input current ICC, while not jeopardizing the power controller 502 due to the hibernation nature of the state. However, when the power switch is turned on and turned off, the power controller 502 returns to the active state so that it can measure voltage and current again. In such case, timing is to ensure IC 109 comes out of the low power mode before the switching pulse is turned on, and goes back to the low power mode after the switching pulse is turned off and all measurements are done.

In some embodiments, the first and second threshold voltages are generated from a bandgap circuit 503. Referring back to the exemplary circuit in FIG. 5, the UVLO is 7.5V and the two threshold voltages are 10V and 11V, respectively, which are slightly greater than the UVLO. Accordingly, a first comparator 504 is configured to compare the power supply input voltage VCC with the first threshold voltage level, 10V. Similarly, a second comparator 505 is configured to compare the power supply input voltage VCC with the second threshold voltage level, 11V. In some embodiments, the outputs from comparator 504 and 505 are combined and processed by a light-off state control logic 507 to keep power supply input voltage VCC between 10V and 11V by turning on and turning off transistor Q2 accordingly, to avoid cross-regulation and dropping below the UVLO voltage during the transient stage when the output voltage is transitioning from normal voltage to light-off. After the sensed output voltage VOUT at VSENSE is equal to the predetermined voltage, the power controller 502 switches transistor Q1 on and off to regulate the output voltage VOUT to the predetermined voltage. As previously provided, once output voltage VOUT achieves steady state, transistor Q2 is cut off and not turned on again to avoid consuming energy from the main power supply bus VBUS. Comparator 506 is configured to compare the power supply input voltage VCC with the UVLO voltage, which is 7.5V in this example. By keeping the output of comparator 706 positive, power supply input voltage VCC can be kept above the UVLO voltage.

Figure 7:
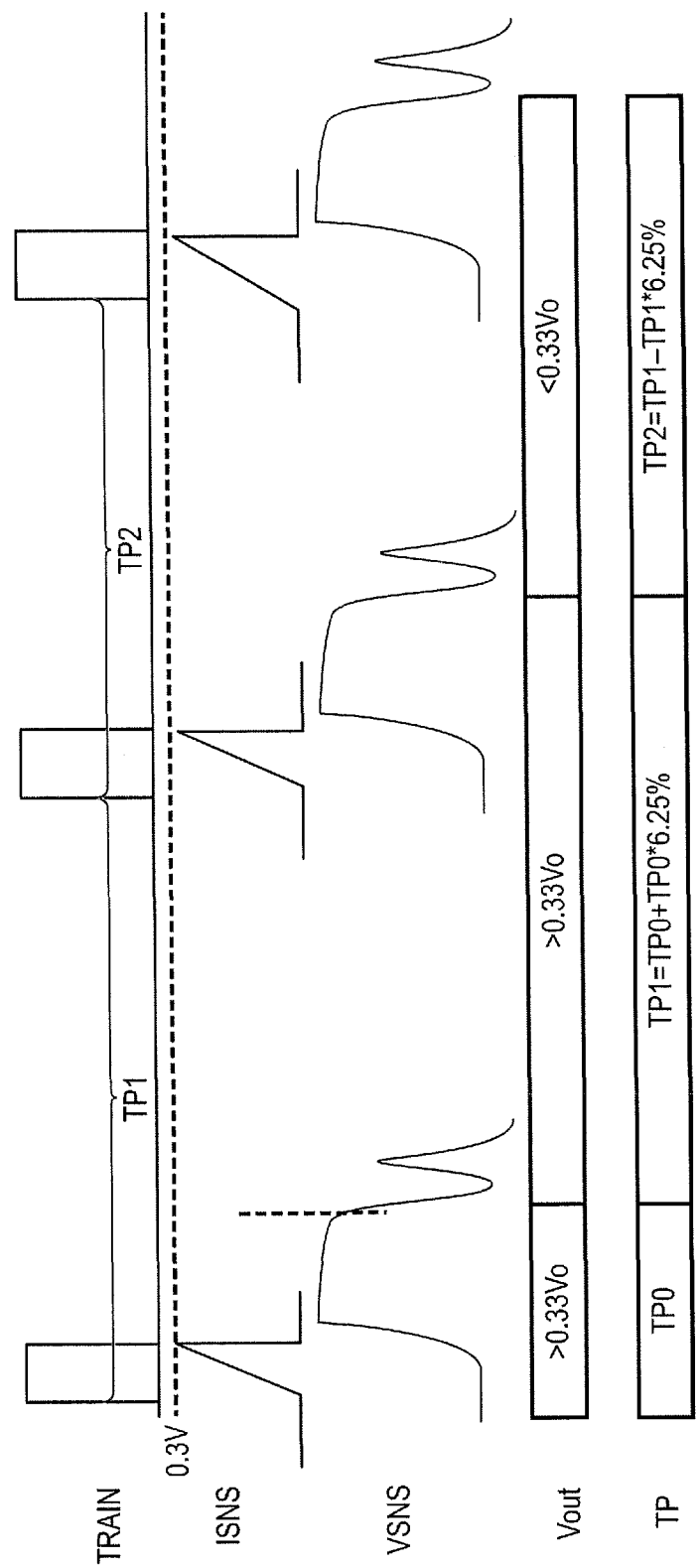
FIG. 7 is a graph of various signals when approaching light-off state.
Figure 8:
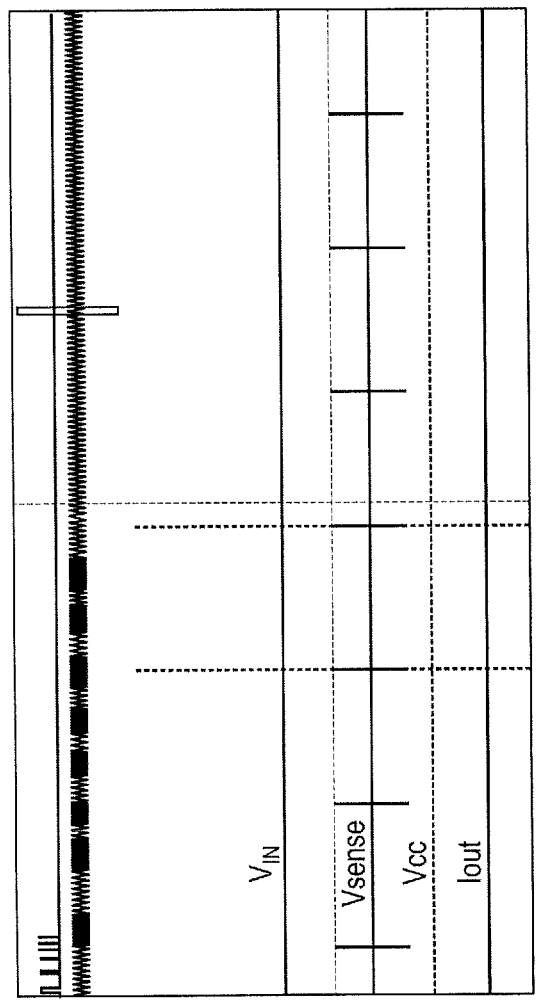
FIG. 8 is a graph of various waveforms in light-off state.

As provided, output voltage VOUT regulation can be accomplished according to various techniques. A simple way to avoid loop compensation is to use a fixed current command (e.g., 0.3V) for ISENSE input to determine the pulse width. Then, the VSENSE voltage may be used to determine switching period. For example, if the sensed voltage is greater than the target value, the switching period for next cycle will be increased by a predetermined value (e.g., 6.25%), or decreased by a predetermined value if the sensed voltage is less than the target value. A small hysteresis may be reserved for the reference value to avoid oscillation. FIG. 7 shows the concept on how to control the switching period, and FIG. 8 shows the measured waveforms in the light-off state. As shown, VIN is pulled low to cut off transistor Q2 to save power in the steady state, while IC 109 is regulating output voltage VOUT at low level to sustain VCC while achieving very low energy consumption.

Figure 9:
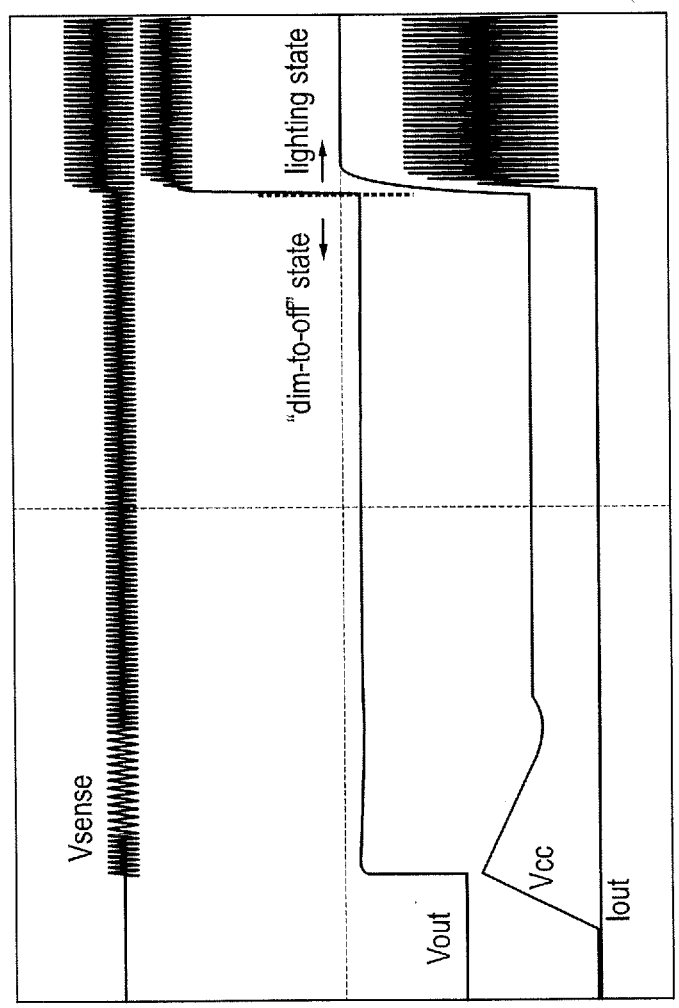
FIG. 9 is a graph of various signals during a startup process from shutdown.

In some embodiments, when it is desired to turn the LED 108 back on from a shut down state, the power converter 100 is first brought back to the light-off mode, and then brought to the normal operating mode. FIG. 9 illustrates the startup process from shut down to light-off to normal operation.

Figure 10:
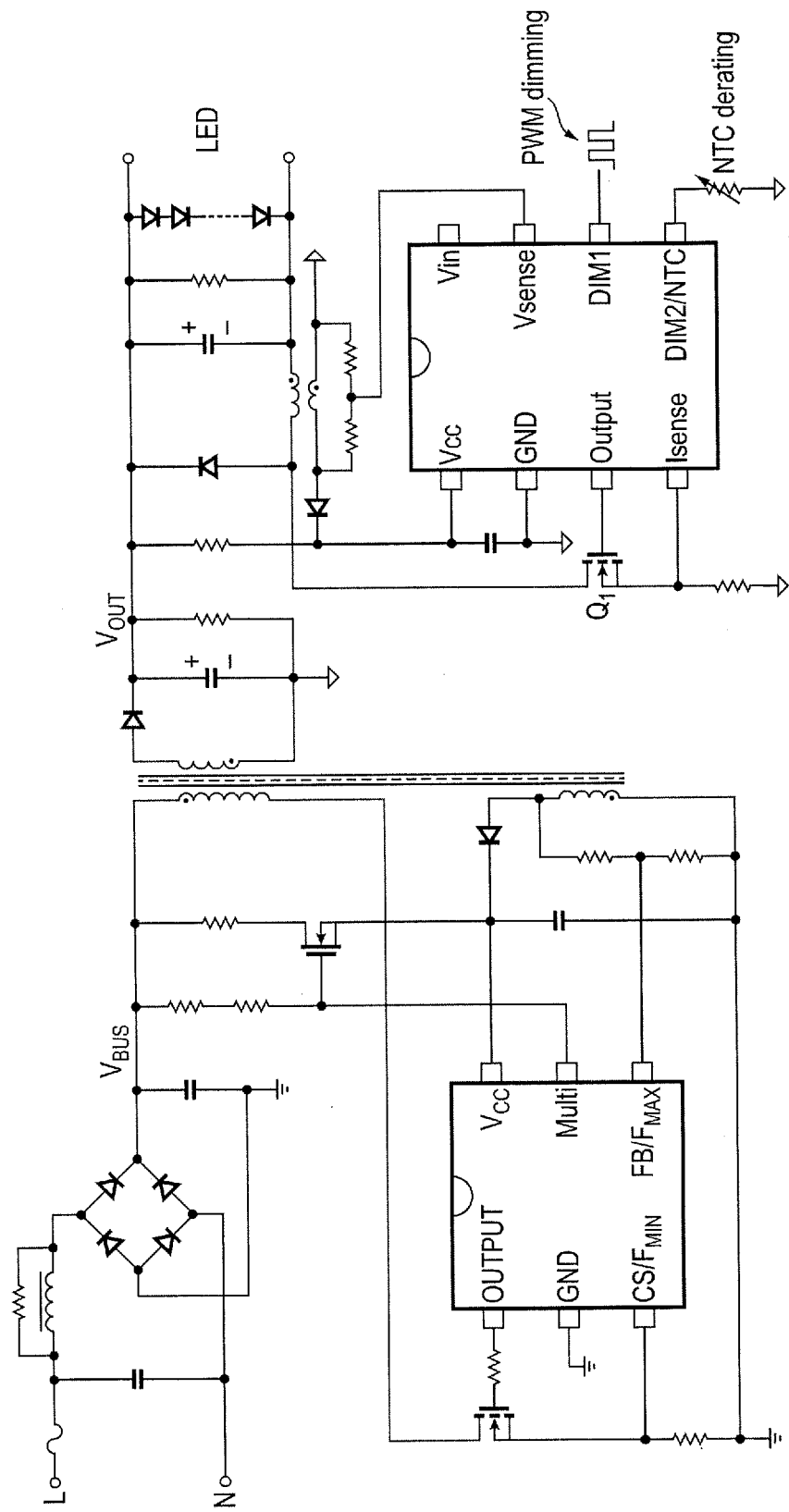
FIG. 10 is an exemplary circuit diagram of a two-stage solution using flyback and low-voltage buck converter, according to an embodiment.
Figure 11:
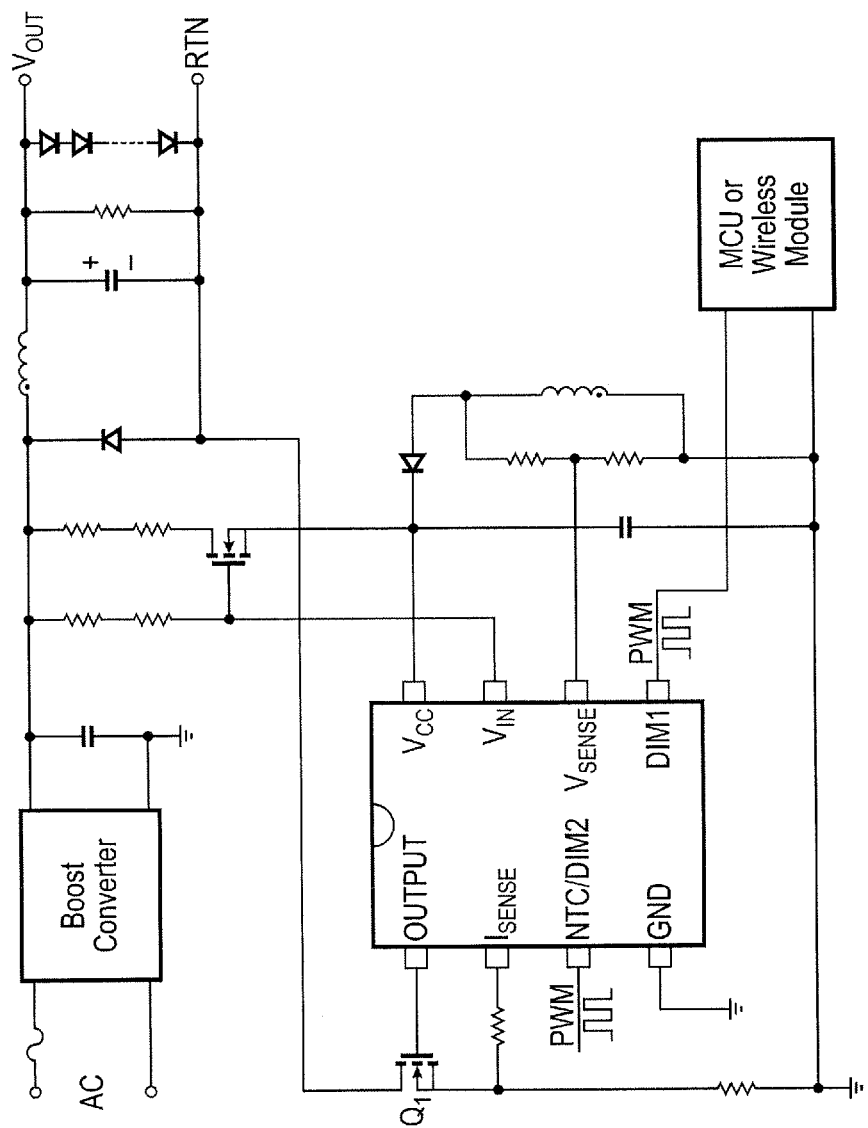
FIG. 11 is an exemplary circuit diagram of a two-stage solution using boost and high-voltage buck converter, according to an embodiment.

FIG. 10 is an exemplary circuit diagram of two-stage solution incorporating a low-voltage buck converter as a second stage to remove doubled line-frequency ripple in LED current, and FIG. 11 is another exemplary circuit diagram of a two-stage solution incorporating high-voltage buck converter, according to various embodiments of the present disclosure. In some embodiments, the power supply input voltage VCC may be regulated in the light-off mode while conserving power by maintaining the power supply input voltage VCC to a voltage slightly higher than the UVLO. By regulating the power supply input voltage VCC, output voltage VOUT is also controlled due to the magnetic coupling by the transformer. Although the output voltage VOUT and power supply input voltage VCC are not in a direct linear relationship, they are substantially proportional. Thus, a higher output voltage VOUT will result in a higher power supply input voltage VCC, and a lower output voltage VOUT will result in a lower power supply input voltage VCC. Therefore, by controlling power supply input voltage VCC to be a small value just above the UVLO voltage, the resulting output voltage VOUT is also at its minimum.

Differently from the technique described above with reference to the circuit in FIG. 1, this technique does not draw power from the main power supply bus VBUS. However, this technique relies on transistor Q1, which is the main switch that turns on the power converter, to charge the power supply input voltage VCC. Thus, transistor Q1 in FIGS. 10 and 11 are configured to be selectively turned on and off to turn on or off LED 108 at output voltage VOUT.

Figure 12:
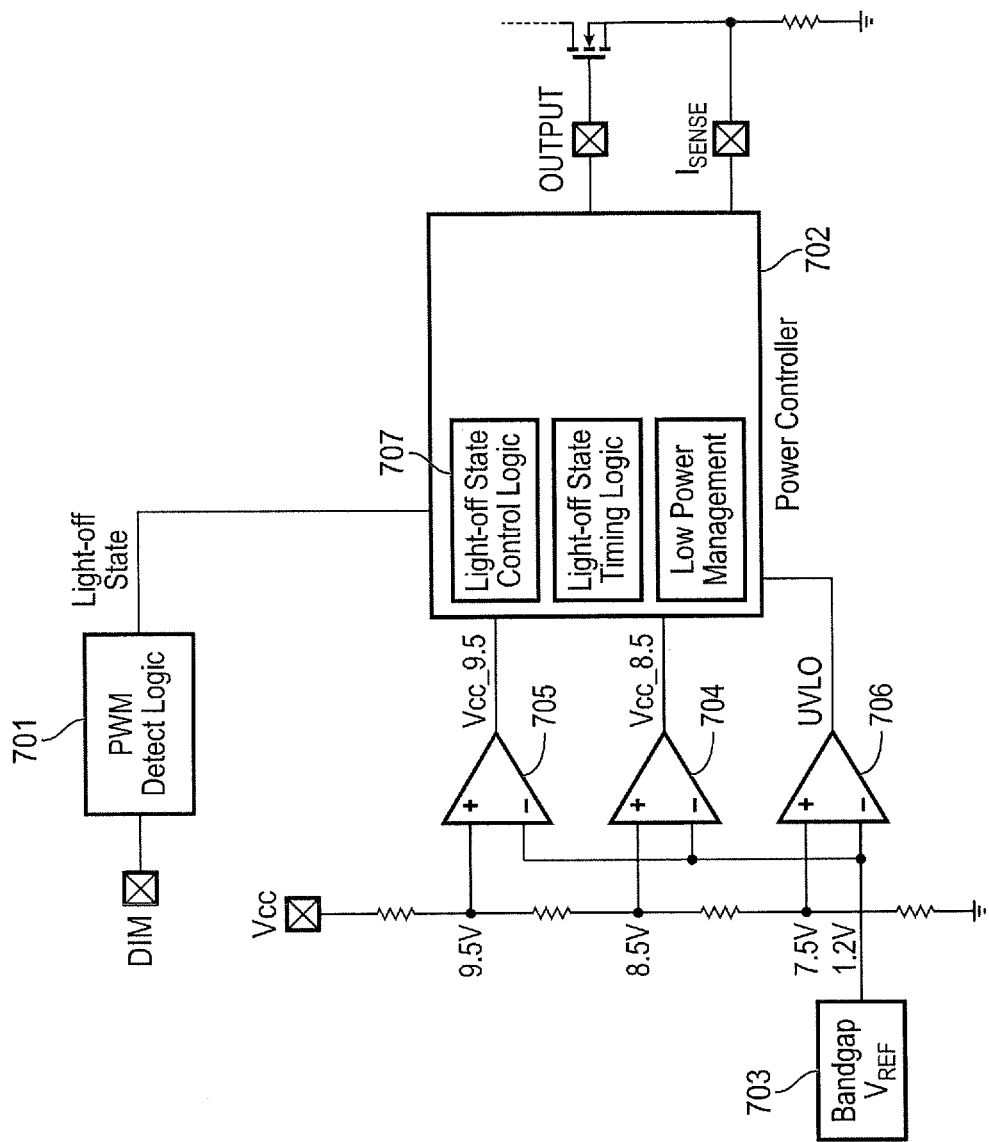
FIG. 12 is a circuital diagram of an exemplary converter for controlling the output voltage OUT by regulating the power supply input voltage VCC into a small band slightly above the UVLO voltage, according to an embodiment.

FIG. 12 is a circuital diagram of an exemplary converter for regulating the output voltage OUT while avoiding cross-regulation and maintaining the power supply input voltage VCC above the UVLO voltage, according to another embodiment.

Similarly to the circuital implementation in FIG. 5, a PWM Detect Logic 701 measures the PWM input signal at DIM input of the IC 109. When the duty-ratio is less than a predetermined threshold value (e.g., 0.5%), which is less than the lowest dimming level of the LED 108 (e.g., 1.0%), power controller 502 puts the IC 109 into light-off state. Once the IC 109 is in the light-off state, the power controller 502 enables the low power mode to reduce VCC consumption by the IC 109. The low power mode may be achieved by, disabling unnecessary analog function blocks e.g., cut VDAC and IDAC, VSENSE comparators and ISENSE comparators, slowing down the driver and some of comparators, slowing down digital clock speed (e.g., by $\frac{1}{16}$ of the original speed), and disable unnecessary logic (e.g., no thermal detection is required during light-off state).

In some embodiments, a critical timing logic is used to implement the low power mode and to wake up from the light-off state back to the normal operation state. FIG. 6 shows an example sequence of signals. The clock frequency is masked by the low power mode enabling signal LP_EN. When LP_EN is high, the low power mode is enabled, and vice versa. In the light-off mode, the switching frequency is substantially reduced (e.g., 1 kHz). During most of time in the 1 ms switching period, the LP_EN is high, and the clock speed is reduced by $\frac{1}{16}$ or more (e.g., $\frac{1}{64}$) to save power supply input current ICC, while not jeopardizing the power controller 702 due to the hibernation nature of the state. However, when the power switch is turned on and turned off, the power controller 702 returns to the active state so that it can measure voltage and current again. In such case, timing is critical to ensure IC 109 comes out of the low power mode before the switching pulse is turned on, and goes back to the low power mode after the switching pulse is turned off and all measurements are done.

In some embodiments, the first and second threshold voltages are generated from bandgap 703. In the illustrated example, the UVLO is 7.5V and the two threshold voltages are 8.5V and 9.5V, respectively, which are slightly greater than the UVLO. Note, that the first and second threshold voltages according to this technique are closer to the UVLO voltage than the thresholds in the implementation of FIG. 5. In the implementation of FIG. 5, the first and threshold voltages do not necessarily have to be as close to the UVLO voltage (with respect to the implementation of FIG. 12) because at steady state, output voltage VOUT is regulated by VSENSE. Accordingly, a first comparator 704 is configured to compare the power supply input voltage VCC with the first threshold voltage level, 8.5V. Similarly, a second comparator 705 is configured to compare the power supply input voltage VCC with the second threshold voltage level, 9.5V. When the output of comparator 704 is negative, the IC 109 may begin to switch (i.e., turn on and off) at a predetermined frequency (e.g., 25 kHz) at fixed peak current command until power supply input voltage VCC increases and the output of comparator 705 becomes positive when transistor Q1 is turned off. By repeating this process, power supply input voltage VCC may be maintained between 8.5V and 9.5V. In this manner, the IC 109 power consumption is reduced as well as the overall power consumption, thus the output voltage VOUT can be controlled to a small voltage without relying on a substantial dummy load to achieve the low output voltages to turn off the LED 108 and keep them in the light-off mode. Comparator 706 is configured to compare the power supply input voltage VCC with the UVLO voltage, which is 7.5V in this example. By keeping the output of comparator 706 positive, power supply input voltage VCC can be kept above the UVLO voltage.

Accordingly, at steady-state, the IC 109 operates at low power level with low current consumption, which does not consume much power (e.g., given VCC=10V and ICC=0.5 mA, the IC 109 power consumption is only about 5 mW). With low VCC power consumption, cross-regulation can be easily avoided without adding a significant amount of dummy load at the output. As a result, the total power consumption may be reduced to about 75 mW or less in standby mode power can be achieved even at high-line input voltage.

Figure 13:
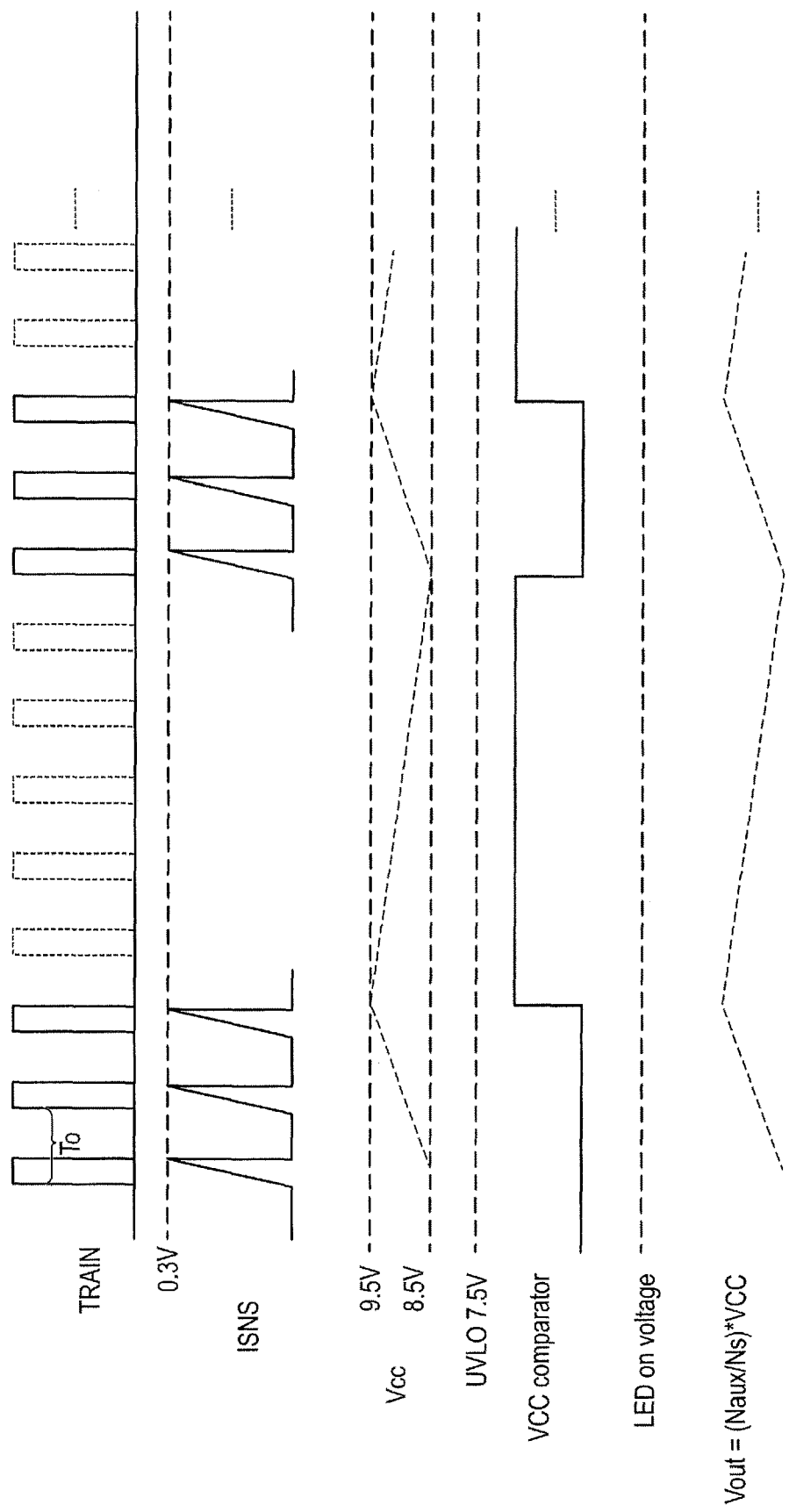
FIG. 13 is a graph of various signals when regulating the power supply input voltage VCC.

FIG. 13 is a graphical representation of regulating power supply input voltage VCC and keeping the LED 108 off. As shown, the IC 109 regulates power supply input voltage VCC to a voltage band (e.g., 8.5V to 9.5V) that is slightly higher than the UVLO voltage (e.g., 7.5V). For every observe period To (e.g., 30 us), system checks the output of comparators 704 and 705 as illustrated with signal ISENSE. Power supply input voltage VCC is kept above UVLO voltage of 7.5V, while maintaining it between 8.5V and 9.5V.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A flyback converter for powering an LED, comprising:
 a power switch transistor coupled to a primary winding of a transformer;
 a controller configured to control a switching of the power switch transistor to regulate a an output power to the LED during a lighting mode in which an output voltage to the LED is greater than an LED threshold voltage, and wherein the controller is further configured to regulate a light-off output voltage to the LED during a light-off state in which the output voltage to the LED is less than the LED threshold voltage, the controller including a controller power supply voltage input node for a controller power supply voltage coupled to an auxiliary winding of the transformer through a diode; and
 a power supply transistor coupled between the power supply voltage input node and an input voltage bus coupled to the primary winding;
 wherein the controller is configured to cycle the power supply transistor during a transition period to the light-off state to maintain the controller power supply voltage above an undervoltage-lockout (UVLO) voltage for the controller.

2. The flyback converter of claim 1, wherein the controller is configured to enter a low power mode in response to the LED entering the light-off state.

3. The flyback converter of claim 1, wherein the controller is configured to maintain the power supply transistor off in response to the output voltage equaling a steady-state value that is less than the LED threshold voltage.

4. The flyback converter of claim 1, wherein the controller is configured to transition to the light-off state in response to a pulse-width modulated (PWM) signal.

5. The flyback converter of claim 1, wherein the controller is configured to transition to the light-off state in response to a duty cycle of the PWM signal being less than 1%.

6. The flyback converter of claim 1, wherein the controller is configured to cycle the power supply transistor during the transition period to maintain the power supply voltage between a first threshold voltage and a second threshold voltage, and wherein the first threshold voltage and the second threshold voltage are both greater than the UVLO voltage.

7. The flyback converter of claim 1, wherein the controller is configured to regulate the light-off output voltage through a pulse-width modulation of the power switch transistor using a pulse width determined responsive to a peak current through the power switch transistor and a switching period determined responsive to a sensed version of a voltage across the auxiliary winding.

8. A flyback converter for powering an LED, comprising:
 a power switch transistor coupled to a primary winding of a transformer;
 a controller configured to control a switching of the power switch transistor to regulate a an output power to the LED during a lighting mode in which an output voltage to the LED is greater than an LED threshold voltage, and wherein the controller is further configured to control the switching of the power switch transistor to regulate a controller power supply voltage for the controller to maintain the controller power supply voltage to be greater than an undervoltage-lockout (UVLO) voltage for the controller during a light-off state in which the output voltage to the LED is less than the LED threshold voltage.

9. The flyback converter of claim 8, wherein the controller is configured to switch on the power switch transistor during the light-off state responsive to the controller power supply voltage being less than a first threshold voltage and to switch off the power switch transistor responsive to the controller power supply voltage being greater than a second threshold voltage, wherein the second threshold voltage is greater than the first threshold voltage and the first threshold voltage is greater than the UVLO voltage.

10. The flyback converter of claim 9, wherein the controller includes a first comparator configured to compare the controller power supply voltage to the first threshold voltage and includes a second comparator configured to compare the controller power supply voltage to the second threshold voltage, wherein the controller is further configured to switch on the power switch transistor in response to an output signal from the first comparator and to switch off the power switch transistor in response to an output signal from the second comparator.

* * * * *

UNITED STATES PATENT AND TRADEMARK OFFICE
CERTIFICATE OF CORRECTION

PATENT NO. : 10,375,780 B2
APPLICATION NO. : 16/044455
DATED : August 6, 2019
INVENTOR(S) : Zhiqiu Ye et al.

Page 1 of 1

It is certified that error appears in the above-identified patent and that said Letters Patent is hereby corrected as shown below:

In the Specification

In Column 2, Line 2, change "TOT" to --IOT--.

Signed and Sealed this
First Day of October, 2019

Andrei Iancu
*Director of the United States Patent and Trademark Office*